(12) United States Patent
Handler et al.

(10) Patent No.: US 8,578,701 B2
(45) Date of Patent: Nov. 12, 2013

(54) METHOD FOR OPERATING AN INTERNAL COMBUSTION ENGINE AND DEVICE FOR IMPLEMENTING THE METHOD

(75) Inventors: Torsten Handler, Stuttgart (DE); Christian Walz, Durmersheim (DE); Matthias Loehr, Steinheim/Hoepfigheim (DE)

(73) Assignee: Robert Bosch GmbH, Stuttgart (DE)

( * ) Notice: Subject to any disclaimer, the term of this patent is extended or adjusted under 35 U.S.C. 154(b) by 1112 days.

(21) Appl. No.: 11/517,865

(22) Filed: Sep. 7, 2006

(65) Prior Publication Data
US 2007/0056267 A1 Mar. 15, 2007

(30) Foreign Application Priority Data
Sep. 7, 2005 (DE) .................. 10 2005 042 487

(51) Int. Cl.
*F01N 3/00* (2006.01)
(52) U.S. Cl.
USPC ................. 60/286; 60/274; 60/295; 60/299; 60/301
(58) Field of Classification Search
USPC .................................... 60/274–324
See application file for complete search history.

(56) References Cited

U.S. PATENT DOCUMENTS

| | | | |
|---|---|---|---|
| 5,628,186 A * | 5/1997 | Schmelz | 60/274 |
| 6,698,191 B2 * | 3/2004 | Xu et al. | 60/286 |
| 6,941,746 B2 * | 9/2005 | Tarabulski et al. | 60/286 |
| 6,996,975 B2 * | 2/2006 | Radhamohan et al. | 60/286 |
| 7,028,465 B2 * | 4/2006 | Ripper et al. | 60/286 |
| 7,086,223 B2 * | 8/2006 | Itoh et al. | 60/286 |
| 7,093,427 B2 * | 8/2006 | van Nieuwstadt et al. | 60/286 |
| 7,178,328 B2 * | 2/2007 | Solbrig | 60/286 |
| 8,020,374 B2 * | 9/2011 | Walz et al. | 60/286 |
| 2009/0199542 A1 * | 8/2009 | Walz et al. | 60/276 |

FOREIGN PATENT DOCUMENTS

| | | |
|---|---|---|
| DE | 199 03 439 | 8/2000 |
| DE | 199 60 731 | 6/2001 |
| DE | 199 62 912 | 7/2001 |
| DE | 10 2004 046 640 | 3/2005 |
| DE | 10 2004 031 624 | 2/2006 |
| EP | 1283332 | 2/2003 |
| WO | WO 2005068797 | 7/2005 |

* cited by examiner

*Primary Examiner* — Binh Q Tran
*Assistant Examiner* — Jesse Bogue
(74) *Attorney, Agent, or Firm* — Kenyon & Kenyon LLP

(57) ABSTRACT

A method for operating an internal combustion engine in whose exhaust-gas region at least one SCR catalytic converter is disposed, which is acted upon by a reagent contributing to the NOx conversion in the SCR catalytic converter, and a device for implementing the method. The reagent level in the SCR catalytic converter is controlled or regulated to a predefined reagent setpoint level, which is specified to at least a maximum value, which corresponds to an SCR catalytic converter completely filled with reagent. In this way the SCR catalytic converter is always operated at the highest possible efficiency at which the highest possible NOx conversion takes place.

7 Claims, 2 Drawing Sheets

METHOD FOR OPERATING AN INTERNAL COMBUSTION ENGINE AND DEVICE FOR IMPLEMENTING THE METHOD

FIELD OF THE INVENTION

The present invention is based on a method for operating an internal combustion engine in whose exhaust region an SCR catalyst is situated, and on a method for implementing the method.

BACKGROUND INFORMATION

German Patent Application No. DE 199 03 439 describes a method and a device for operating an internal combustion engine in whose exhaust region an SCR (selective catalytic reduction) catalytic converter is disposed, which reduces the nitrogen oxide contained in the exhaust gas of the internal combustion engine to nitrogen with the aid of a reagent. The reagent is preferably dosed as a function of operating parameters of the internal combustion engine such as the rotational speed and the injected fuel quantity. Moreover, the dosing is preferably implemented as a function of exhaust-gas characteristics such as the exhaust-gas temperature or the operating temperature of the SCR catalytic converter.

The reducing agent ammonia, for instance, which may be obtained from a urea-water solution, is provided as reagent. The dosing of the reagent or of starting materials of the reagent must be specified with care. If the dosage is too low, the nitrogen oxide in the SCR catalytic converter will no longer be reducible completely. If the dosage is too high, reagent slippage occurs, which not only results in an unnecessarily high reagent use but also in an unpleasant smell as a function of the reagent's composition.

In German Patent Application Nos. DE 199 60 731 and DE 199 62 912, NOx sensors are described, which detect the NOx concentration present in an exhaust-gas stream. The described NOx sensors have a plurality of chambers, which are interconnected via the diffusion barriers. Due to the measuring principle the known multi-chamber NOx sensors have a cross sensitivity with respect to ammonia ($NH_3$). The ammonia—as an example of a reagent—contained in the exhaust gas leads to a falsification of the sensor signal via the reactions $4NH_3 + 5O_2 \rightarrow 4NO + 6H_2O$.

Therefore, if the reagent dosage is increased in the previously known methods and if overdosing or correct dosing of the reagent takes place, the sensor signal will increase because of the occurring reagent slippage, and if underdosing has occurred, the sensor signal will decrease due to the increasing NOx conversion. However, if the reagent dosage is reduced and overdosing of the reagent is present, the sensor signal will decrease because of the reduced reagent slippage, and if correct dosing or underdosing is present, it will increase because of the no longer complete NOx conversion.

In German Patent Application No. DE 10 2004 046 640 (not prepublished), a method for operating an internal combustion engine and a device for implementing the method are described in which an NOx sensor having cross sensitivity with respect to a reagent is situated downstream from an SCR catalytic converter. At least one SCR catalytic converter, which is acted upon by the reagent contributing to the NOx conversion in the SCR catalytic converter, is disposed in the exhaust-gas region. The calculation of at least one measure of the NOx concentration occurring downstream from the SCR catalytic converter is provided, which allows the dosage of the reagent to be specified with greater precision. A reagent slippage may be calculated from the difference between the calculated measure of the NOx concentration and the measured measure of the sum of the NOx concentration and the reagent concentration. Taken into account is the fact that both a reagent slippage and also an insufficient NOx reduction reaction produce a deviation in the same direction between the calculated measure of the NOx concentration and the measured measure of the sum of the NOx concentration and the reagent concentration. If the difference is too high, the dosage of the reagent is initially reduced according to one development. If reagent slippage has occurred, the lowering of the reagent dosage will result in reduced reagent slippage. In this case the reduced dosing of the reagent has turned out to be the correct measure. If the dosage of the reagent was too low originally, the ascertained difference will increase further due to the lower NOx conversion, so that it can be inferred from this that the reduction in the dosing of the reagent was wrong and the dosage should be increased instead.

In German Patent Application No. DE 10 2004 031 624 (not prepublished), a generic method for operating an internal combustion engine and a device for implementing the method are described in which an NOx sensor having cross sensitivity with respect to a reagent is once again situated downstream from the SCR catalytic converter. An open-loop control or closed-loop control of the reagent level in the SCR catalytic converter to a predefined reagent setpoint level is provided. The controlled specification of the reagent setpoint level not only ensures that a sufficient reagent quantity for the optimally possible complete removal of the NOx raw emissions of the internal combustion engine is available in non-stationary states of the internal combustion engine, but also that no reagent slippage occurs.

The reagent level in the SCR catalytic converter is ascertained with the aid of a catalytic converter model, which takes into account the NOx mass flow entering the SCR catalytic converter, the NOx mass flow leaving the SCR catalytic converter, the catalytic converter temperature and possibly the reagent slippage. The reagent level of the SCR catalytic converter depends on the operating temperature of the SCR catalytic converter, in particular, which is highest at low operating temperatures and drops to lower values as the operating temperature rises. The efficiency of the SCR catalytic converter depends on the catalytic activity, which is low at low operating temperatures, runs through a maximum with an increasing operating temperature, and then drops again as the operating temperature increases further. According to a preferred development, the predefined difference between the maximally possible reagent level and the reagent setpoint level should not fall below a specified measure such as 20%, so that in a sudden, pronounced temperature increase the desorbed reagent quantity in the SCR catalytic converter is able to react with the offered NOx quantity, so that reagent slippage is avoided in all operating situations.

The present invention is based on the objective of providing a method for operating an internal combustion engine in whose exhaust-gas region an SCR catalytic converter is situated, and a device for implementing the method, which ensure the greatest possible NOx conversion in all operating situations, if possible.

SUMMARY OF THE INVENTION

The method according to the present invention for operating an internal combustion engine in whose exhaust-gas region at least one SCR catalytic converter is situated, which is acted upon by a reagent contributing to the NOx conversion in the SCR catalytic converter and in which the reagent level in the SCR catalytic converter is controlled or regulated to a predefined reagent setpoint level, provides that the predefined reagent setpoint level be specified to at least a maximum value, which corresponds to an SCR catalytic converter completely filled with reagent.

The method according to the present invention ensures that the maximum NOx conversion is achieved in components of a reagent dosing system, in determining a reagent signal and in the SCR catalytic converter, even taking production variances into account. By specifying the reagent setpoint level to the maximally possible value and even to a value greater than the maximum value, the emphasis is placed on the maximally possible NOx conversion in the SCR catalytic converter. An occasional reagent slippage or even a continuously occurring minimal reagent slippage, which is limited as much as possible by the closed-loop or open-loop control, will be tolerated. The method according to the present invention considerably reduces the complexity of a basic application in connection with a possibly provided specification of a reagent precontrol variable.

According to a first measure, at least one measure of the NOx concentration occurring downstream from the SCR catalytic converter is calculated and measured by an NOx sensor having cross sensitivity with respect to the reagent. The difference possibly arising between the ascertained values may be utilized to control the reagent dosing. Since the reagent level in the SCR catalytic converter is specified to the maximum value or to a value greater than the maximum value according to the present invention, it may be assumed that an occurring difference is always a measure of the reagent slippage and not of underdosing. By reducing the dosage the control or regulation always correctly responds to the difference, in particular if the dosage is reduced only until no further reagent slippage occurs.

One measure provides that the ascertained difference be utilized to specify a change in the reagent level in the SCR catalytic converter. This controls the dosing indirectly, via a manipulation of the ascertained reagent level in the SCR catalytic converter.

One measure provides that the temperature of the SCR catalytic converter be used in addition to the difference to control the dosing.

One development provides that the reagent level in the SCR catalytic converter be regulated at least to the maximum value. Steady-state accuracy is achieved within the framework of a closed-loop control.

The device for operating an internal combustion engine according to the present invention first of all relates to a control device, which is configured to execute the method. The control device includes, in particular, a difference determination, which ascertains the difference between the exhaust gas sensor signal provided by an NOx sensor having cross sensitivity with respect to the reagent, and the NOx concentration downstream from the SCR catalytic converter calculated by an NOx concentration determination. Moreover, means are provided that influence the calculated reagent level in the SCR catalytic converter as a function of the difference.

The control device preferably includes at least one electrical memory in which the method steps are stored in the form of a computer program.

DETAILED DESCRIPTION

Figure 1:
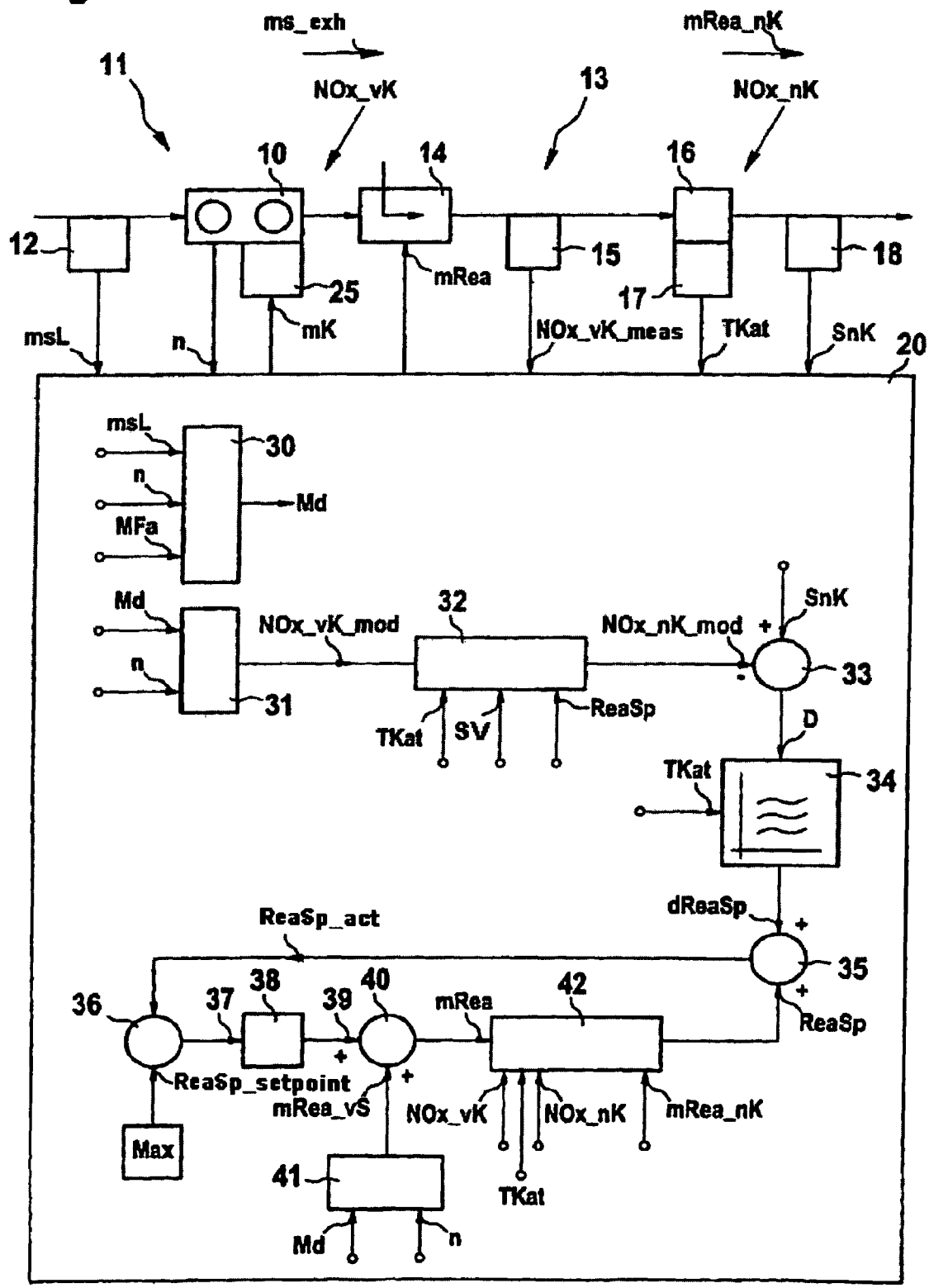
FIG. 1 shows a technical environment in which a method according to the present invention is running.

FIG. 1 illustrates an internal combustion engine 10 in whose intake region 11 an air detection 12 is situated, and in whose exhaust-gas region 13 a reagent dosing system 14, a first NOx sensor 15, an SCR catalytic converter 16, a temperature sensor 17 assigned to SCR catalytic converter 16, and also a second NOx sensor 18 are situated.

An exhaust-gas flow ms_exh and an NOx raw concentration NOx_vK occur downstream from internal combustion engine 10. An NOx concentration NOx_nK and a reagent slippage mRea_nK occur downstream from SCR catalytic converter 16.

Air determination 12 provides an air signal msL to a control device 20, internal combustion engine 10 a rotation signal n, first NOx sensor 15 a first NOx signal NOx_vK_meas, temperature sensor 17 a measure of temperature TKat of SCR catalytic converter 16, and second NOx sensor 18 an exhaust-gas sensor signal SnK.

Control device 20 makes available to a fuel-metering device 25 assigned to internal combustion engine 10 a fuel signal mK, and to reagent dosing system 14 a reagent signal mRea.

Control device 20 includes a torque determination 30 to which air signal msL, rotation signal n, and a torque setpoint value MFa are supplied, and which ascertains a torque Md of internal combustion engine 10.

Furthermore, control device 20 includes an NOx raw concentration determination 31, to which rotation signal n and torque Md are made available and which ascertains a calculated measure NOx_vK_mod of NOx raw concentration NOx_vK.

In addition, control device 20 includes an NOx concentration determination 32 to which calculated measure NOx_vK_mod of NOx raw concentration NOx_vK, temperature signal Tkat, an exhaust-gas space velocity SV and a reagent level ReaSp are made available, and which ascertains a calculated measure NOx_nK_mod of NOx concentration NOx_nK downstream from SCR catalytic converter 16.

Calculated measure NOx_nK of NOx concentration NOx_nK and exhaust-gas sensor signal SnK are provided to a first difference determination 33, which ascertains a difference D. Difference D and the measure of temperature TKat are made available to a characteristics map 34, which supplies a level change dReaSp which is conveyed to a first summing unit 35.

Summing unit 35 determines from level change dReaSp and reagent level ReaSp a reagent actual level ReaSp_act, which is provided to a second difference determination 36, which determines a system deviation 37 from reagent actual level ReaSp_act and a reagent setpoint level ReaSp_setpoint, which is specified to at least a maximum value Max.

A controller 38 determines a control variable 39 from system deviation 37, which is provided to a second summing unit 40, which adds a reagent precontrol variable mRea_VS to control variable 39 and which supplies reagent signal mRea. Reagent precontrol variable mRea_VS is provided by a precontrol variable determination 41, which ascertains reagent precontrol variable mRea_VS from torque Md and rotation signal n.

Reagent signal mRea is supplied to a catalytic converter model 42, which is additionally provided with NOx raw concentration NOx_vK, NOx concentration NOx_nK, the measure of temperature Tkat, and reagent slippage mRea_nK. Catalytic converter model 42 provides reagent level ReaSp.

Figure 2:
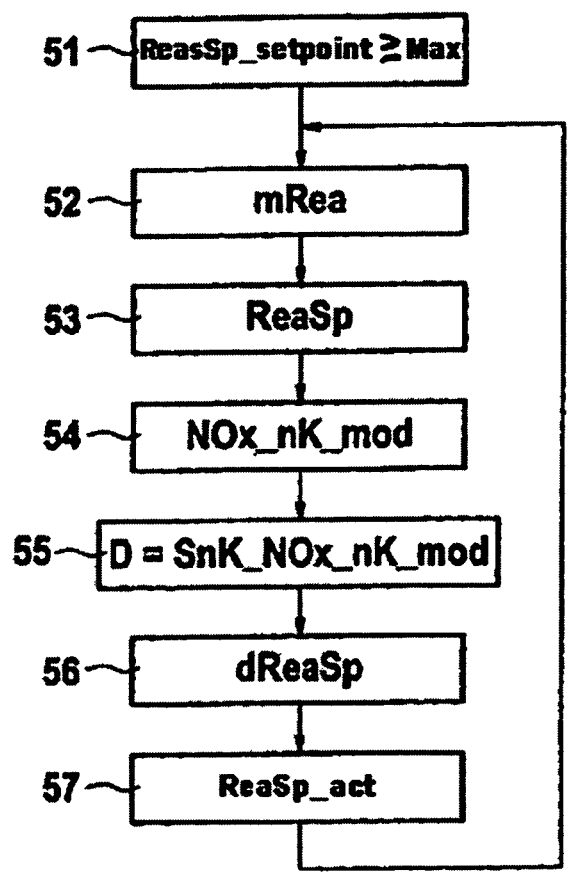
FIG. 2 shows a flow chart of a method according to the present invention.

FIG. 2 shows a flow chart beginning with a first functional block 51, which provides for a specification of reagent setpoint level ReaSp_setpoint to maximum value Max or greater. Reagent signal mRea is specified in a second functional block 52. In a third functional block 53, reagent level ReaSp in SCR catalytic converter 16 is ascertained. In a fourth functional block 54, measure NOx_nK_mod of NOx concentration NOx_nK is calculated. Fifth functional block 55 is provided to calculate difference D. In a sixth functional block 56, level change dReaSp is specified, and in a seventh functional block 57, reagent actual level ReaSp_act is determined. It will then be branched back to functional block 52.

The method of the present invention operates as follows:

Torque determination 30 situated in control device 20 ascertains torque Md to be supplied by internal combustion engine 10 as a function of at least predefined torque setpoint value MFa, which is provided by, for instance, an accelerator pedal (not shown further) of a motor vehicle in which internal combustion engine 10 is situated as drive motor. Torque Md is at least approximately a measure of the loading of internal combustion engine 10. When ascertaining torque Md, rotation signal n and/or air signal msL provided by air detection 12 may be taken into account as well.

Control device 20 outputs fuel signal mK to fuel-metering device 25, which is specified on the basis of torque Md, in particular. Fuel signal mK specifies, for instance, a fuel injection instant and a fuel injection quantity. The fuel combusted in internal combustion engine 10 leads to exhaust-gas stream ms_exh, which may contain the undesired NOx raw concentration NOx_vK to a greater or lesser degree as a function of the operating point of internal combustion engine 10.

For the largest possible removal of NOx concentration NOx_vK at least SCR catalytic converter 16 is situated in exhaust-gas region 13 of internal combustion engine 10. In addition to SCR catalytic converter 16, additional catalytic converters and/or a particulate filter may be provided. SCR catalytic converter 16 facilitates the reducing reaction of the NOx by a reagent, which is either dosed into exhaust-gas region 13 using reagent dosing system 14, or which may possibly be provided within the engine. A starting material may be provided instead of the reagent. If ammonia is used as reagent, a urea-water solution or ammonium carbamate, for instance, may be provided as starting material instead of ammonia. The dosing is specified by reagent signal mRea, which in the exemplary embodiment shown is provided to reagent dosing system 14. As an alternative or in addition, if the reagent is provided within the engine, fuel signal mK may be modified by reagent signal mRea in such a way that the required reagent will be produced inside the engine.

After starting the method according to the present invention, reagent setpoint level ReaSp_setpoint is specified at least to maximum value Max in first functional block 51. Maximum value Max corresponds to the maximally possible reagent level in SCR catalytic converter 16, which is a function of the temperature inside SCR catalytic converter 16. The relation is described in detail in German Patent Application No. DE 10 2004 031 624 described above, which is hereby incorporated by reference herein. Reagent setpoint level ReaSp_setpoint may also be specified to a value higher than maximum value Max, in which case an at least slight reagent slippage mRea_nK must always be expected.

An important advantage of specifying reagent setpoint level ReaSp_setpoint to at least maximum value Max or to a higher value which may exist as operand only, is that SCR catalytic converter 16 will always be operated within the range of its maximum efficiency at which the highest possible NOx conversion takes place. It is ensured that NOx concentration NOx_nK has the lowest possible value in all operating states both of internal combustion engine 10 and SCR catalytic converter 16, and with all characteristic quantities of the exhaust gas in exhaust-gas region 13. A reagent slippage mRea_nK occurring at least from time to time must be tolerated. If reagent setpoint level ReaSp_setpoint is specified to a value higher than maximum value Max, a slight reagent slippage mRea_nK will always occur.

Reagent level ReaSp in SCR catalytic converter 16 may be controlled to predefined reagent setpoint level ReaSp_setpoint. A regulation to predefined reagent setpoint level ReaSp_setpoint is preferably provided. In second difference determination 36 reagent setpoint level ReaSp_setpoint is compared to reagent actual level ReaSp_act. Second difference determination 36 ascertains system deviation 37, which is conveyed to controller 38, which determines control variable 39 from system deviation 37.

In second summing unit 40, control variable 39 is added to preferably available reagent precontrol variable mRea_VS. Reagent precontrol variable mRea_VS may specify, for instance, a basic quantity of the reagent to be dosed as a function of operating parameters of internal combustion engine 10. Torque Md and rotation signal n, for instance, are taken into account in precontrol determination 41. Such a procedure allows a relatively simple application. Maximum value Max of the reagent level is available in SCR catalytic converter 16 even if a value higher than maximum value Max is predefined as reagent setpoint level ReaSp_setpoint.

Control variable 39, which may possibly be linked with available reagent precontrol variable mRea_VS, specifies reagent signal MRea according to second functional block 52, which is conveyed to reagent dosing system 14 and/or fuel-metering device 25. Reagent signal mRea, for instance, releases an opening cross section of a valve corresponding to a predefined reagent throughflow, which also depends on the reagent pressure.

According to third functional block 53, catalytic converter model 42 determines reagent level ReaSp with the aid of reagent signal mRea, taking into account NOx raw concentration NOx_vK, NOx concentration NOx_nK and the measure of temperature TKat in SCR catalytic converter 16. Reagent slippage mRea_nK may additionally be taken into consideration, if appropriate. Catalytic converter model 42 has already been described in the mentioned related art to which reference is made here once again.

According to fourth functional block 54, calculated measure NOx_nK_mod of NOx concentration NOx_nK is determined. The calculation is carried out in NOx concentration determination 32 on the basis of calculated measure NOx_vK_mod for NOx raw concentration NOx_vK, which is provided by NOx raw concentration determination 31 with the aid of torque Md and/or rotation signal n, for instance. NOx concentration determination 32 ascertains an efficiency of SCR catalytic converter 16 on the basis of the measure of temperature TKat in SCR catalytic converter 16 supplied by temperature sensor 17, which may be situated upstream in front of, within or downstream from SCR catalytic converter 16, so that the sensor signal is at least approximately a measure of the temperature of SCR catalytic converter 16. Instead of a temperature measurement, the catalytic converter temperature may also be estimated.

Moreover, NOx concentration determination 32 preferably takes exhaust-gas space velocity RG into account, which is able to be determined from the known geometrical data of SCR catalytic converter 16 and exhaust-gas flow ms_exh.

Reagent level ReaSp is advantageously taken into consideration since the efficiency depends to a particular degree also on reagent level ReaSp in SCR catalytic converter 16.

Measure NOx_nK_mod of NOx concentration NOx_nK, calculated by NOx concentration determination 32, is deducted from exhaust-gas sensor signal SnK in first difference determination 33 in order to obtain difference D. If such a difference D occurs, this difference D may be considered in the dosing strategy and reagent signal mREA may be corrected.

As a matter of principle it is possible to record NOx concentration NOx_nK behind SCR catalytic converter 16 with the aid of an NOx sensor, and reagent slippage mRea_nK with the aid of a reagent sensor. Especially advantageous, however, is the utilization of a cross sensitivity of second NOx sensor 18 with respect to the reagent. If the second NOx sensor has cross sensitivity with respect to the reagent, exhaust-gas sensor signal SnK reflects the sum from reagent slippage mRea_nK and NOx-concentration NOx_nK. Therefore, an occurring difference D could mean that either a reagent slippage mRea_nK or a high NOx concentration NOx_nK has occurred. A differentiation would not be possible in this operating state. Because of the procedure according to the present invention it may be assumed that overdosing of the reagent is taking place, so that an occurring difference D always corresponds to a reagent slippage mRea_nK.

A response to occurring difference D may consist of reducing reagent signal mRea. According to the illustrated exemplary embodiment, the intervention in reagent signal mRea occurs indirectly, by manipulating reagent level ReaSp calculated by catalytic converter model 42. Reagent actual level ReaSp already includes the change.

According to sixth functional block 56, reagent level ReaSp is influenced by level change dReaSp, which is provided by characteristics map 34 as a function of difference D and possibly as a function of the measure of temperature TKat. Characteristics map 34 is provided with value pairs within the framework of an application; with a constant difference D, at a higher temperature TKat, reagent level ReaSp is to be increased to a lesser extent than with a lower temperature TKat. If a difference D occurs according to a reagent slippage mRea_nK, an increase in reagent actual level ReaSp_act occurs according to seventh functional block 57, which results in a reduction of reagent signal mRea. The closed-loop control is provided in the illustrated exemplary embodiment, so that reagent slippage mRea_nK either occurs only briefly or is restricted to a slight measure in a constant overdosing of the reagent.

What is claimed is:

1. A method for operating an internal combustion engine in whose exhaust-gas region at least one SCR catalytic converter is situated, the method comprising:

acting upon the SCR catalytic converter by a reagent contributing to an NOx conversion in the SCR catalytic converter; and controlling a reagent level in the SCR catalytic converter to a predefined reagent setpoint level, wherein the predefined reagent setpoint level is specified to a value greater than a maximum value, and wherein the maximum value corresponds to the SCR catalytic converter completely filled with the reagent.

2. The method according to claim 1, further comprising:

calculating and measuring at least a measure of an NOx concentration occurring downstream from the SCR catalytic converter by an NOx sensor having cross sensitivity with respect to the reagent; and determining a difference between the calculated measure of the NOx concentration and a measured sum of the NOx concentration and a reagent slippage.

3. The method according to claim 2, further comprising utilizing the difference to specify a level change of the reagent level in the SCR catalytic converter.

4. The method according to claim 3, further comprising, in addition to the difference, utilizing a measure of the temperature of the SCR catalytic converter to specify the level change of the reagent level in the SCR catalytic converter.

5. The method according to claim 1, further comprising regulating the reagent level in the SCR catalytic converter to at least the maximum value.

6. A device for operating an internal combustion engine in whose exhaust-gas region at least one SCR catalytic converter is situated, which is acted upon by a reagent contributing to an NOx conversion in the SCR catalytic converter, the device comprising:

at least one control device configured to control a reagent level in the SCR catalytic converter to a predefined reagent setpoint level, wherein the predefined reagent setpoint level is specified to a value greater than a maximum value, and wherein the maximum value corresponds to the SCR catalytic converter completely filled with the reagent.

7. The device according to claim 6, wherein the control device includes a difference determination, which determines a difference between an exhaust-gas sensor signal provided by an NOx sensor having cross sensitivity with respect to the reagent, and an NOx concentration downstream from the SCR catalytic converter, calculated by an NOx concentration determination, and further comprising means for influencing the reagent level in the SCR catalytic converter as a function of the difference.

* * * * *